Jan. 23, 1951    P. H. THOMPSON    2,539,285
CORROSION RESISTANT SOLENOID WITH ARMATURE
Original Filed March 2, 1946
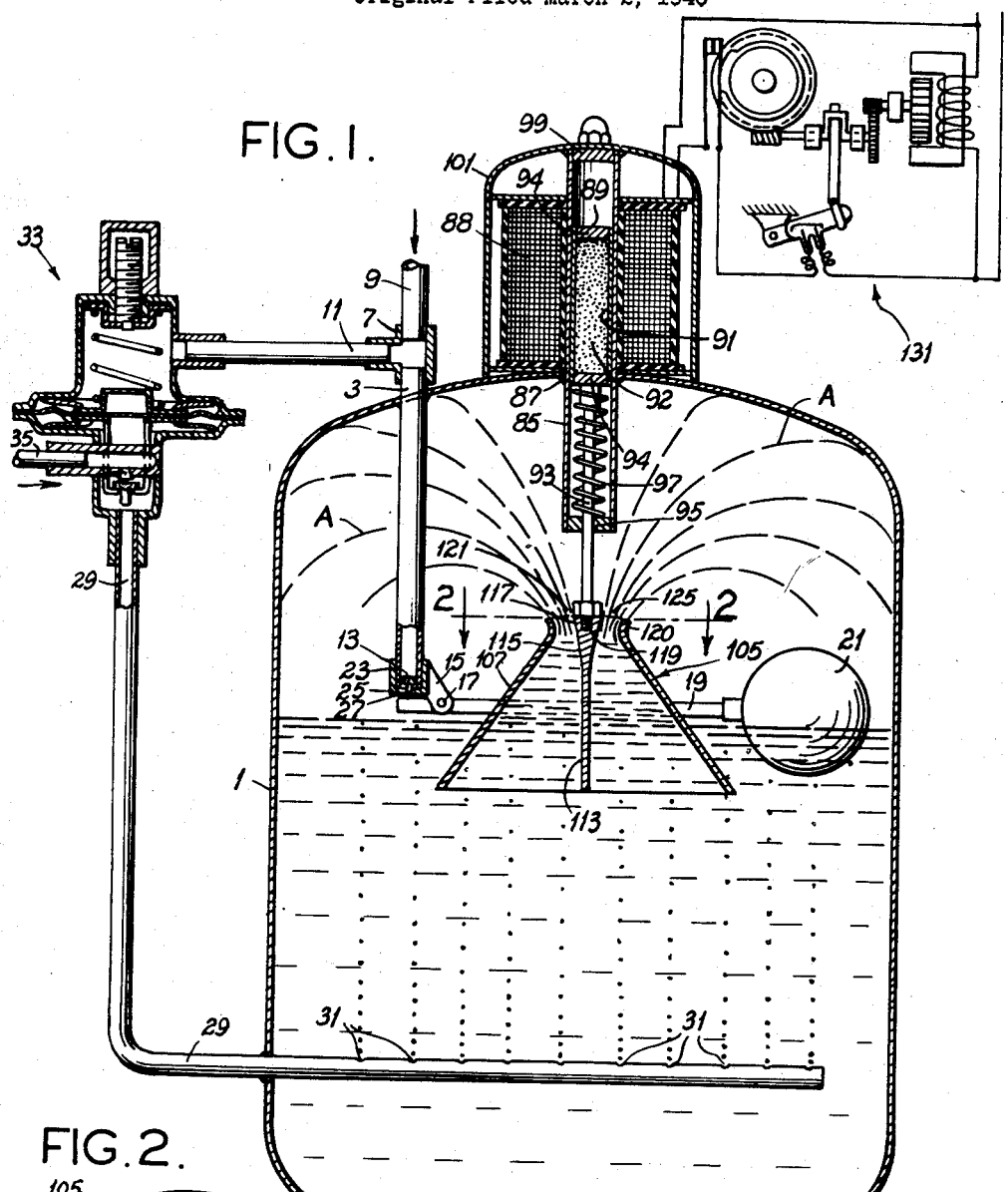
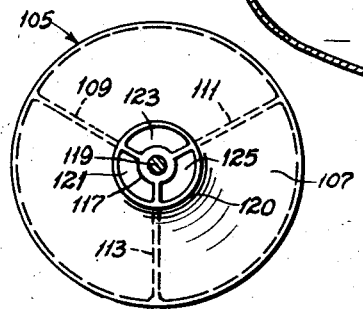
INVENTOR
Parke H. Thompson.
by Alfred W Petchaft
Atty.

Patented Jan. 23, 1951

2,539,285

UNITED STATES PATENT OFFICE 2,539,285

CORROSION RESISTANT SOLENOID WITH ARMATURE

Parke H. Thompson, Kirkwood, Mo., assignor, by mesne assignments, to Marion L. J. Lambert, doing business as Crystal-Flo Products Company, St. Louis, Mo.

Original application March 2, 1946, Serial No. 651,647. Divided and this application December 26, 1946, Serial No. 718,561

5 Claims. (Cl. 175—341)

This invention relates to gas-dissolving apparatus and, more particularly, to corrosion resistant solenoids with armatures for water carbonators, and is a division of my co-pending application, Serial No. 651,647, filed March 2, 1946, now Patent No. 2,531,655.

Among the several objects of the invention may be noted the provision of a water carbonator wherein tap water received at tap water temperature may be efficiently carbonated; the provision in such a carbonator including a pressure tank having a tap water supply inlet and an inlet for gas under pressure, of means for automatically maintaining tank pressure less than the tap water pressure; the provision in such a carbonator of improved means for agitating and spraying the water requiring no rotary shaft packing; and, the provision of apparatus of the class described which requires relatively few and simple parts. Other objects will be in part obvious and in part pointed out hereinafter.

The invention accordingly comprises the elements and combinations of elements, features of construction, and arrangements of parts which will be exemplified in the structures hereinafter described, and the scope of the application of which will be exemplified in the structures hereinafter described, and the scope of the application of which will be indicated in the following claims.

In the accompanying drawings, in which one of various possible embodiments of the invention is illustrated, Figure 1 is a vertical section through carbonating apparatus exemplifying the invention, and illustrating in a diagrammatic elevation a control associated therewith; and Figure 2 is a section on line 2—2 of Figure 1.

Similar reference characters indicate corresponding parts throughout the several views of the drawings.

Referring now to the drawings, a pressure tank 1, containing tap water which is to be carbonated, has a tap water inlet pipe 3 and a carbonated water outlet pipe 5. The top of the tank 1 is dome-shaped. Pipe 3 is connected into one arm of a T 7, a tap water supply pipe 9 being connected into the other arm of the T. Pipe 9 is connected to a suitable source of water under pressure, such as a city water main. A conduit 11, to be referred to hereinafter, is connected into the stem of the T.

The normal water level in tank 1 is as shown in Figure 1. The water level is controlled by a float-operated valve in the lower end of water inlet pipe 3, the lower end of pipe 3 being closed by a cap 13, having a bracket 15 depending therefrom. Pivotally mounted at 17 in the bracket 15 is a float arm 19 having a float 21 at one end and a valve 23 on valve stem 25 at its other end. Valve 23 is adapted to close an aperture 27 in the end of said cap 13 when float 21 rises. This occurs upon a rise of the water level in said tank above normal, said aperture 27 being opened when the water level falls below normal, due to withdrawal of carbonated water from the tank. Aperture 27 is sufficiently large so that water may flow around valve stem 25.

A carbon dioxide ($CO_2$) gas inlet pipe 29 extends into tank 1 and has apertures 31 within the tank from which gas bubbles into the water. Pipe 29 is connected, outside the tank, to the outlet of a gas supply regulator and control valve generally designated 33. This valve controls flow of gas from a $CO_2$ gas supply pipe 35 to said tank. Pipe 35 is connected to a source of $CO_2$ under pressure. Control valve 33 is provided to maintain the pressure in tank 1 less than the pressure of water in inlet 3, since, if the tank pressure were permitted to become higher than the pressure of the water supply, water could not flow into the tank. The control valve 33 is more fully described in my copending application Ser. No. 651,647.

A tube 85, preferably of stainless steel is secured (as by welding), in an aperture 87 in the top of pressure tank 1. This tube projects upward from the tank through a solenoid 88, the latter being mounted on the tank. Slidably mounted in said tube 85 is a solenoid plunger or armature 89, preferably comprising a completely closed cylindrical stainless steel or similar non-corrosive cylindric container 91, hermetically sealed at both ends by caps 94 and filled with tightly packed magnetic particles 92, such as iron filings, or particles of precipitated pure iron. A plunger rod 93, secured to the lower end of said plunger 89, extends downward into the tank, sliding in a bearing 95 in the lower end of tube 85. A compression spring 97 is interposed between the lower end of the plunger 89 and the bearing 95, biasing plunger 89 upward. The upper end of tube 85 is hermetically sealed by a welded plug 99, so as to prevent leakage of gas from the tank 1, and the solenoid 88 and the projecting end of tube 85 are enclosed within a dome-shaped casing 101.

A plunger bell or cup, generally designated by reference character 105, is secured to the lower end of plunger rod 93. The plunger cup, as illustrated in Figure 1, is substantially in the form of a hollow truncated cone, the conical wall 107 thereof being internally braced by three radial ribs 109, 111 and 113. The ribs merge at the center line of the cone and are thickened at their upper central portions, as indicated at 115, forming a hub 117. Hub 117 is formed with a threaded bore therein receiving threaded lower end 119 of plunger rod 93. Said thickened portions 115 also cooperate with an outwardly curved lip 120 on the upper end of conical wall 107 to form, in effect, a nozzle for directing water forced through the upper end of said cup 105 outwardly, as indicated by dash lines A in Figure 1.

Upon energization of solenoid 88, plunger cup 105 is rapidly forced down into the water in tank 1, thereby forcing water upward through the three nozzle apertures 121, 123, and 125 between the ribs in the upper end of said plunger cup 105. The apertures cause the water to spray upward and outward. Figure 1 shows the plunger and plunger cup approaching the lower end of the stroke. When plunger 89 moves downward, spring 97 is compressed and, upon deenergization of the solenoid 88, the spring forces the plunger to the upper limit of its stroke. The specific construction of the plunger cup 105 described herein is merely exemplary of the principles involved and any other form of plunger cup adapted to spray water upward and outward, as illustrated by the dashed lines A in Figure 1, may be used. The chief criterion is that it shall be hollow and flared downward as a bell with a relatively small outlet, or outlets, at the top. This accelerates the water to form a spray.

The plunger assembly (comprising plunger 89, plunger rod 93 and plunger cup 105) is adapted periodically to be reciprocated rapidly for a short time interval. This is accomplished by a solenoid control, generally designated 131 and more fully described in my copending application Ser. No. 651,647 referred to above. This control is so constructed as, for example, to deenergize solenoid 88 completely for fourteen minutes, then rapidly and intermittently energize and deenergize solenoid 88 for one minute, then completely deenergize solenoid 88 for fourteen minutes, and so on. It will be understood that these time intervals are merely illustrative.

The operation of the apparatus is as follows:

Pipes 3 and 11 and the corresponding part of valve 33 are filled with tap water from tap water supply pipe 9. If the water level in tank 1 is normal, valve 23 is closed. No water flows into the tank. If the water level is too low, due to carbonated water having been drawn off through outlet 5, valve 23 opens and admits water to make up the deficiency.

It may be assumed that, at the start of the operation, tank 1 has been filled to normal level with tap water, but that there is no gas therein. Since, in such event, there is less pressure on the underside of diaphragm 47 than on its upper side, the diaphragm is biased downward by the pressure of tap water in upper portion of valve 33 and the latter. Gas then flows from the source through pipe 35 into the lower chamber of valve 33 and through gas inlet pipe 29 into the tank 1. Pressure builds up in the tank 1 until it is sufficiently high to overcome the downward bias on diaphragm of the valve 33 whereupon valve 33 closes to cut off flow of gas into the lower tank 1. As has been previously pointed out, said valve element closes when the pressure in the tank 1 builds up to a predetermined value somewhat less than the pressure of the tap water. Control valve 33 thus functions to maintain the pressure of gas in the tank 1 always less than the pressure of the tap water supply, so that tap water may always flow into the tank when called for by opening of the float valve 23. This eliminates any necessity for a tap water pump to force water into the tank 1 against the pressure therein. The relationship between the pressure of gas in the tank 1 and the pressure of the tap water supply is maintained even though the pressure of the tap water supply should vary, as it often does, since the valve 33 closes whenever the tank pressure becomes a predetermined number of pounds less than the tap water pressure, despite the actual values of these pressures. If the pressure of the tank 1 should fall, due, for example, to drawing off of carbonated water therefrom, the gas pressure in the lower chamber of valve 33 falls and valve 33 opens to admit gas to the tank 1 and build up the pressure therein to said value a predetermined number of pounds less than tap water pressure. This provides a desirable constant degree of carbonation.

The solenoid control 131, as described in my copending application Ser. No. 651,647, operates to intermittently open and close the circuit of solenoid 88 and the solenoid 88 is thus energized to drive its plunger 89, plunger rod 93 and cup 105 downward, forcing said cup down into the water and spraying water upward and outward through the nozzle apertures 121, 123 and 125 in the upper end of said cup. Since solenoid control 131 functions rapidly to make and break said circuit, it thereby rapidly intermittently energizes and deenergizes the solenoid 88. Such action causes rapid reciprocation of plunger cup 105 to agitate and spray the water upward and outward as previously described.

Carbonation is effected both in the water and in the space above. Gas flowing into the tank through inlet pipe 29 bubbles out into the water through apertures 31. Some of the gas is dissolved as it bubbles upward through the water. The remainder bubbles to the surface and out into the space thereabove. Some of the latter is dissolved in the spray above the water surface, gas in the space thereabove coming into intimate surface contact with the broken-up water particles in said spray and with the large surface area of water cascading over the interior of the walls of the tank. The water in the tank is agitated and sprayed upward and outward against the dome-shaped top and side walls of the tank during spaced short intervals. The water cascading over the dome-shaped top and side walls of the tank also presents large surface areas thereof not only for gas absorption but also for heat transfer. For example, the tank 1 may be surrounded by a cooling medium such as ice.

The length of the period of operation of the plunger and the length of the interval therebetween are determind by th characteristics of the solenoid control 131, and may be varied by substituting different worms and worm gears and/or different cams to provide for different conditions of use.

The construction herein disclosed may be made very small and this is an important advantage. Structurally it is very simple. Another advantage is that no shaft seals or packings are required. The tube 85 is merely welded shut at its upper end by plug 99, and to the tank at 87, and leakage of gas from the tank is thereby effectively prevented. The solenoid control 131 may be of a suitable construction other than that disclosed and may be enclosed within the dome-shaped casing 101.

An important point of the invention is that although the armature 89 is operating in an atmosphere of moisture and $CO_2$, it will not, like ordinary laminated iron armatures, tend to disintegrate. This is because of the use of the enclosing stainless steel tube 91 surrounding the magnetic iron 92. Such a tube is non-corrosive in the presence of the contents of the tank and protects the comminuted magnetic iron, which would otherwise be corroded. This form of iron als has low hysteresis losses and is easier to organize in its protective compartment than would be laminated iron sheets.

It is to be understood that all parts within the tank, and even the tank itself, are to be made of non-corrosive materials, such as stainless steel.

Although the particular disclosure of the invention is in reference to a water carbonator, its principles apply to any gas dissolving apparatus of analogous requirements.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

Having thus described my invention, what I claim and desire to secure by Letters Patent is:

1. An apparatus of the character described comprising a solenoid, a stainless steel tube mounted concentrically within and secured to said solenoid, said tube projecting upwardly and downwardly beyond the solenoid, a stainless steel armature slidable within said tube, said armature being hermetically sealed, and tightly packed magnetic particles within said armature.

2. An apparatus of the character described comprising a solenoid, a stainless steel tube mounted concentrically within and secured to said solenoid, said tube projecting upwardly and downwardly beyond the solenoid, a stainless steel armature slidable within said tube, said armature being hermetically sealed, and tightly packed magnetic particles in intimate contact within said armature.

3. An apparatus of the character described comprising a solenoid, a stainless steel tube mounted concentrically within and secured to said solenoid, said tube projecting upwardly and downwardly beyond the solenoid, a stainless steel armature slidable within said tube, said armature being hermetically sealed, and tightly packed magnetic particles in intimate conductive contact within said armature.

4. In apparatus of the character described, a stainless steel tube enclosed at its upper end and provided with an aperture at its lower end, an armature slidably mounted in said tube, said armature comprising a stainless steel container filled with particles of comminuted iron in intimate conductive contact, a plunger rod secured to the lower end of said armature, said rod extending downwardly through the aperture in the lower end of the tube, a compression spring interposed between the lower end of the armature and the lower end of the tube, a solenoid winding around said tube, and a housing enclosing said solenoid.

5. In apparatus of the character described, a stainless steel tube enclosed at its upper end and provided with an aperture at its lower end, an armature slidably mounted in said tube, said armature comprising a stainless steel container filled with particles of comminuted iron in intimate conductive contact, a plunger rod secured to the lower end of said armature, said rod extending downwardly through the aperture in the lower end of the tube, a compression spring interposed between the lower end of the armature and the lower end of the tube, a solenoid winding around said tube, and a housing enclosing said solenoid, said tube being connected at its upper end to the housing.

PARKE H. THOMPSON.

REFERENCES CITED

The following references are of record in the file of this patent:

UNITED STATES PATENTS

| Number | Name | Date |
| --- | --- | --- |
| 683,954 | Liebreich | Oct. 8, 1901 |
| 724,060 | Thomas | Mar. 31, 1903 |
| 874,908 | Fritts | Dec. 24, 1907 |
| 1,003,068 | Schaller | Sept. 12, 1911 |
| 1,157,051 | Schweitzer | Oct. 19, 1915 |
| 1,707,541 | Roth | Apr. 2, 1929 |
| 2,230,762 | Rittenhouse | Feb. 4, 1941 |
| 2,263,051 | Rittenhouse et al. | Nov. 18, 1941 |
| 2,284,891 | Hartig | June 2, 1942 |
| 2,394,103 | Rader | Feb. 5, 1946 |
| 2,457,681 | Keating | Dec. 28, 1948 |

FOREIGN PATENTS

| Number | Country | Date |
| --- | --- | --- |
| 191,756 | Great Britain | Feb. 15, 1923 |
| 554,516 | Germany | July 9, 1932 |
| 806,223 | France | Sept. 21, 1936 |

OTHER REFERENCES

Magnetic Properties of Compressed Powdered Iron by B. Speed and G. W. Elmen, pages 1321 and 1359, esp. pp. 1325 and 1326, Bulletin of the American Institute of Electrical Engineers, 1921.

General Controls Catalogue 52E, August 1947 (page 26), General Controls Co. Branch at 4401 Chouteau Avenue, St. Louis 10, Mo.